Aug. 14, 1934.   F. A. MATHEY   1,970,050
HOSE COUPLING
Filed Sept. 3, 1932
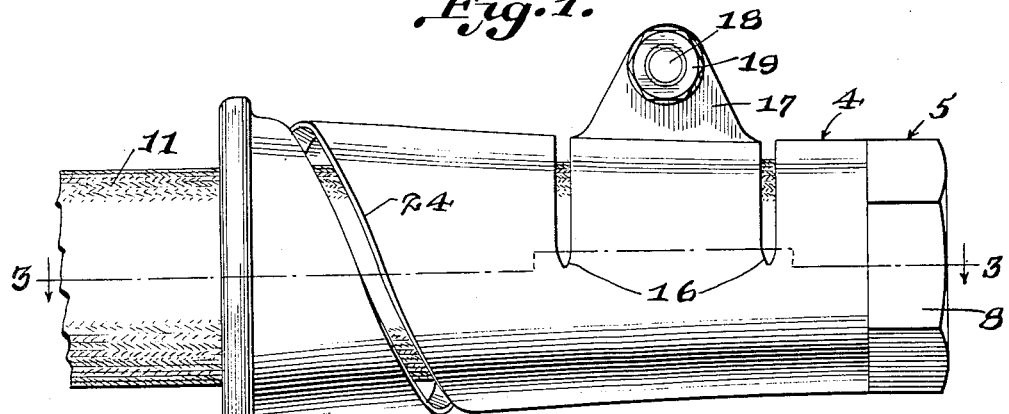
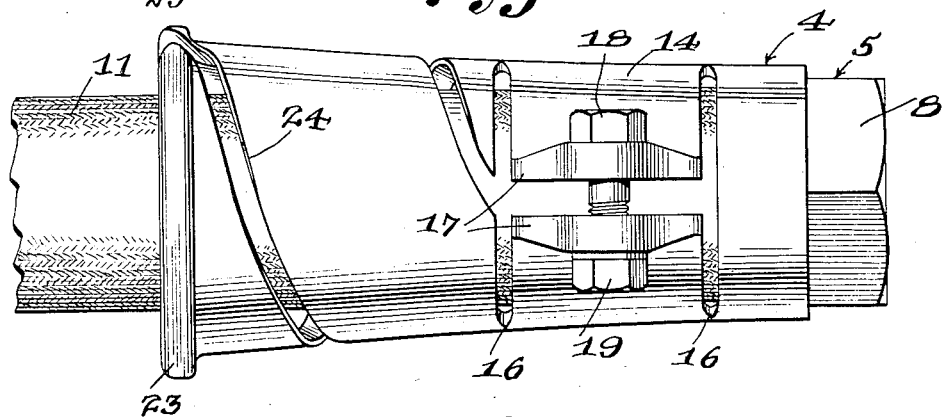
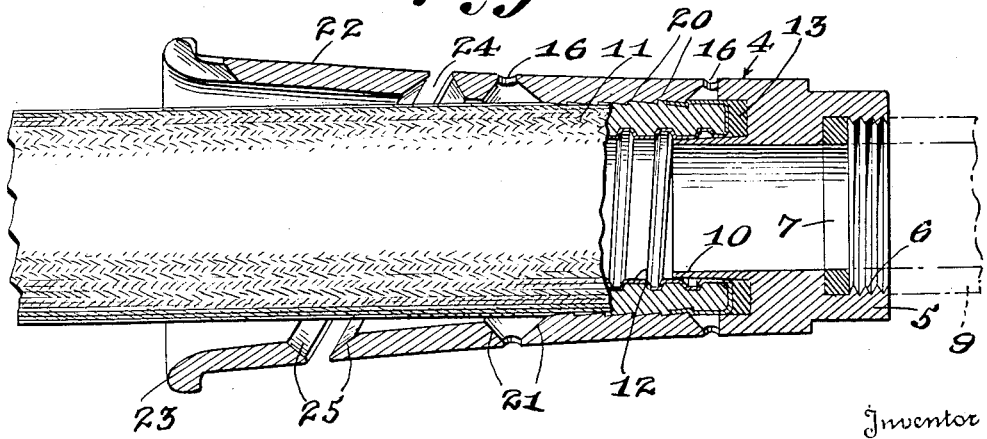
Inventor
F. A. Mathey
By Seymour & Bright
Attorneys Patented Aug. 14, 1934

1,970,050

UNITED STATES PATENT OFFICE 1,970,050

HOSE COUPLING

Ferdinand A. Mathey, New York, N. Y.

Application September 3, 1932, Serial No. 631,694

10 Claims. (Cl. 285—84)

This invention relates to improvements in hose couplings, and more especially to a novel coupling for attaching a hose to a gasoline dispensing pump.

Under present practice, an end of the hose of a gasoline pump is placed in a short coupling which permits the hose when used to be bent at a rather acute angle, which results in considerable damage or breakage. Further, the conventional type of coupling is of such a character that it is necessary to send the hose back to the factory for cutting and reinsertion in the fitting.

The primary purpose of the present invention is to devise a coupling in which the hose can be inserted at the filling station and which coupling, when properly made, will be slightly flexible, due to a slot or slots cut in the lower or outer portion thereof.

A further object is to provide a coupling which will not only protect the hose from breakage, but will have a metal spud to engage the metallic lining of the hose to eliminate danger from static electricity.

With the foregoing objects outlined and with other objects in view which will appear as the description proceeds, the invention consists in the novel features hereinafter described in detail, illustrated in the accompanying drawing, and more particularly pointed out in the appended claims.

In the drawing,

Fig. 1 is a side elevation of the improved coupling.

Fig. 2 is a similar view taken at right angles to Fig. 1.

Fig. 3 is a longitudinal sectional view on the line 3—3 of Fig. 1.

In the embodiment of the invention illustrated in the drawing, 4 designates a sleeve of any suitable material such as metal, provided at one end with an extension 5 having internal screw threads 6 and a packing gasket 7. The exterior of this extension is of polygonal shape as shown at 8, to receive a wrench used in screwing the fitting on to the externally threaded nipple 9 of a gasoline pump or the like.

Within the sleeve there is a spud 10 which projects in a direction away from the extension 5 for the purpose of entering the end of a conventional hose 11, which hose may, if desired, have a metal lining 12. The spud 10 contacts with the inner surface of the hose and reinforces same against the contracting of portion 14 of the sleeve, and when the hose has a metal lining or static wire, contacts with such lining or wire to form a ground connection. The end of the hose impinges against a packing ring 13 which surrounds the spud, and the hose end is anchored in position by contracting an intermediate portion 14 of the sleeve. For this purpose, the sleeve is split as shown at 15, and the ends of the slit merge into circumferentially arranged slots 16. Apertured ears 17 are arranged at the ends of the split portion of the sleeve and may be drawn together by any suitable means such as a bolt and nut 18, 19, for contracting the split portion of the sleeve and causing it to tightly grip the exterior of the hose. To increase the gripping action, the split portion of the sleeve may be provided with circumferentially arranged teeth 20 which indent themselves into the hose when the split portion of the sleeve is contracted.

To increase the flexibility of the sleeve where it is split, it is preferred to taper the opposite edges of the slots 16 as shown at 21.

The sleeve is flared as indicated at 22 from its split portion to its outer end 23, and this flared portion allows bending of the hose at the fitting portion while preventing it from being bent at an acute angle. However, to increase the protection, the outer end or flared portion of the sleeve is provided with one or more slots extending from the split portion 14 to the extremity 23. In the embodiment illustrated, the slot is shown at 24, and it is of spiral shape with its edges chamfered as at 25 to increase the flexibility of the flared portion of the sleeve. The slot 24 obviously makes the flared portion of the sleeve more or less resilient, so that it can give with the hose to some extent when the latter is bent, to prevent the hose from bending at an acute angle.

Obviously the improved fitting is such as to permit an unskilled operator to expeditiously attach or detach the hose by simply manipulating the nut 19 and inserting or removing the hose, as the case may be.

While the fitting has been shown in horizontal position, it will be understood that it is usually used in vertical position.

From the foregoing it is believed that the construction, use and advantages of my novel fitting may be readily understood, and it is manifest that changes may be made in the details disclosed without departing from the spirit of the invention, as expressed in the claims.

What is claimed and desired to be secured by Letters Patent is:

1. A hose fitting comprising a sleeve including an inner end portion, an outer end portion and an intermediate portion, all of said portions being integral with one another, means associated with the inner end portion for attaching the sleeve to a pump nipple or the like, means associated with the intermediate portion of the sleeve for clamping a hose to the sleeve, and means associated with the outer end portion of the sleeve for rendering the last mentioned portion flexible to protect the hose during bending of the latter.

2. A hose fitting comprising a sleeve including an inner end portion, an outer end portion and an intermediate portion, all of said portions being integral with one another, means associated with the inner end portion for attaching the sleeve to a pump nipple or the like, means associated with the intermediate portion of the sleeve for clamping a hose to the sleeve, and means associated with the outer end portion of the sleeve for rendering the last mentioned portion flexible to protect the hose during bending of the latter, the outer end portion of the sleeve having its inner surface flared toward the extremity of the last mentioned portion of the sleeve.

3. A hose fitting comprising a sleeve including an inner end portion, an outer end portion and an intermediate portion, all of said portions being integral with one another, means associated with the inner end portion for attaching the sleeve to a pump nipple or the like, means associated with the intermediate portion of the sleeve for clamping a hose to the sleeve, and means associated with the outer end portion of the sleeve for rendering the last mentioned portion flexible to protect the hose during bending of the latter, the last mentioned means comprising a slot.

4. A hose fitting comprising a sleeve including an inner end portion, an outer end portion and an intermediate portion, all of said portions being integral with one another, means associated with the inner end portion for attaching the sleeve to a pump nipple or the like, means associated with the intermediate portion of the sleeve for clamping a hose to the sleeve, and means associated with the outer end portion of the sleeve for rendering the last mentioned portion flexible to protect the hose during bending of the latter, the last mentioned means comprising a slot extending from the intermediate portion of the sleeve to the extremity of the outer end portion of the sleeve.

5. A hose fitting comprising a sleeve including an inner end portion, an outer end portion and an intermediate portion, all of said portions being integral with one another, means associated with the inner end portion for attaching the sleeve to a pump nipple or the like, means associated with the intermediate portion of the sleeve for clamping a hose to the sleeve, means associated with the outer end portion of the sleeve for rendering the last mentioned portion flexible to protect the hose during bending of the latter, and threads within the intermediate portion of the sleeve adapted to penetrate said hose.

6. A hose fitting comprising a sleeve including an inner end portion, an outer end portion and an intermediate portion, all of said portions being integral with one another, means integral with the inner end portion for attaching the sleeve to a pump nipple or the like, means associated with the intermediate portion of the sleeve for clamping a hose to the sleeve, means associated with the outer end portion of the sleeve for rendering the last mentioned portion flexible to protect the hose during bending of the latter, and a spud arranged within and integral with the sleeve adapted to project into an end of said hose.

7. The combination with a hose, of a fitting for securing an end of the same to a pump or the like, comprising a sleeve having an outer end portion, an intermediate portion and an inner end portion, all of said portions being integral with one another, means integral with the inner end portion for connecting the sleeve to a pump or the like, the intermediate and outer end portions of the sleeve being slotted to render the same resilient, and means for contracting the slotted intermediate portion of the sleeve for clamping the same to said hose, the inner surface of the outer end portion of the sleeve being spaced from the hose to permit the latter to bend within the sleeve.

8. The combination with a hose, of a fitting for securing an end of the same to a pump or the like, comprising a sleeve having an outer end portion, an intermediate portion and an inner end portion, means associated with the inner end portion for connecting the sleeve to a pump or the like, the intermediate and outer end portions of the sleeve being slotted to render the same resilient, and means for contracting the slotted intermediate portion of the sleeve for clamping the same to said hose, the inner surface of the outer end portion of the sleeve being spaced from the hose to permit the latter to bend within the sleeve, the edges of some of the slots being chamfered to increase the resiliency of the sleeve.

9. The combination with a hose, of a fitting for securing an end of the same to pump or the like, comprising a sleeve having an outer end portion, an intermediate portion and an inner end portion, all of said portions being integral with one another, means integral with the inner end portion for connecting the sleeve to a pump or the like, the intermediate and outer end portions of the sleeve being slotted to render the same resilient, and means for contracting the slotted intermediate portion of the sleeve for clamping the same to said hose, the inner surface of the outer end portion of the sleeve being spaced from the hose to permit the latter to bend within the sleeve, and the sleeve being formed of metal and having an integral metal spud projecting into the hose and contacting with the lining of the latter.

10. The combination with a hose, of a fitting for securing an end of the same to a pump or the like, comprising a sleeve having an outer end portion, an intermediate portion and an inner end portion, all of said portions being integral with one another, means integral with the inner end portion for connecting the sleeve to a pump or the like, the intermediate and outer portions of the sleeve being slotted to render the same resilient, and means for contracting the slotted intermediate portion of the sleeve for clamping the same to said hose, the inner surface of the outer end portion of the sleeve being spaced from the hose to permit the latter to bend within the sleeve, said hose having a metal lining, and the sleeve being formed of metal and having an integral metal spud projecting into the hose and contacting with the lining of the latter.

FERDINAND A. MATHEY.